(12) United States Patent
Kawabe et al.

(10) Patent No.: US 6,249,954 B1
(45) Date of Patent: Jun. 26, 2001

(54) PROCESS FOR ASSISTING THE MOUNTING OF A TIRE-WHEEL ASSEMBLY ONTO AN AXLE

(75) Inventors: Hiroshi Kawabe; Kenjiro Yamaya, both of Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/301,544

(22) Filed: Apr. 29, 1999

Related U.S. Application Data

(62) Division of application No. 08/919,507, filed on Aug. 28, 1997, now Pat. No. 5,946,797, which is a continuation of application No. 08/359,650, filed on Dec. 20, 1994, now abandoned.

(30) Foreign Application Priority Data

Dec. 24, 1993 (JP) .................................................. 5-326649

(51) Int. Cl.$^7$ ........................................................ B23Q 3/00
(52) U.S. Cl. ............................ 29/468; 29/821; 269/236; 269/243; 301/5; 301/21
(58) Field of Search ............................. 29/450, 821, 894, 29/894.3, 894.31, 894.321, 406, 468; 269/236, 243, 87, 203; 301/5, 21; 157/16, 17, 18, 21, 24

(56) References Cited

U.S. PATENT DOCUMENTS

| 160,960 | 3/1875 | Rydbeck | 269/236 X |
| 1,016,914 | 2/1912 | Christiana | 269/203 X |
| 2,792,139 | 5/1957 | Lloyd . | |
| 2,852,151 | * | 9/1958 | Smith . | |

FOREIGN PATENT DOCUMENTS

| 2 329 577 | 5/1977 | (FR) . | |
| 597 312 | 1/1948 | (GB) | 269/236 |
| 1 537 437 | 1/1990 | (SU) | 29/821 |
| 1 639 938 | 4/1991 | (SU) | 29/821 |
| 1 771 918 | 10/1992 | (SU) | 29/821 |
| 1771918 | * 10/1992 | (SU) | 29/821 |

* cited by examiner

*Primary Examiner*—S. Thomas Hughes
*Assistant Examiner*—John C. Hong
(74) *Attorney, Agent, or Firm*—Sughrue, Mion, Zinn, Macpeak & Seas, PLLC

(57) ABSTRACT

An apparatus for assisting the mounting of a tire-wheel assembly onto an axle in a high precision without eccentrically arranging the assembly from the axle comprises a pair of opposite clasping members sandwiching the tire-wheel assembly from its side surfaces therebetween, a vibration applying machine fixed to one of the clasping members, and a fastening means for temporarily fastening the clasping members at a given position.

7 Claims, 4 Drawing Sheets

PROCESS FOR ASSISTING THE MOUNTING OF A TIRE-WHEEL ASSEMBLY ONTO AN AXLE

This is a divisional of application Ser. No. 08/919,507, filed Aug. 28, 1997 now U.S. Pat. No. 5,946,797 which is a continuation of application Ser. No. 08/359,650 filed Dec. 20, 1994, now abandoned the disclosure of which is incorporated herein by reference.

BACKGROUND OF THE INVENTION

1. Field of the Invention

This invention relates to an apparatus and a process for assisting the mounting of a tire-wheel assembly onto an. More particularly it relates to an apparatus and a process for assisting the mounting of a tire-wheel assembly onto an axle which can easily conduct the mounting of the tire-wheel assembly onto the axle of a vehicle in a short time while precisely arranging a center of a rotating axis in the tire-wheel assembly with a center of the axle in the vehicle in a straight line and can largely contribute to improve vibration properties in the running of the vehicle and resistance to uneven wear of the tire and is particularly possible to hold adequately corrected static and dynamic unbalancing quantities in the tire-wheel assembly even after the assembly is mounted onto the vehicle.

2. Description of the Related Art

An outline of mounting the tire-wheel assembly onto the axle of the vehicle will be described below with reference to FIG. 7 illustrating a to partial sectional view of a main mounting portion.

As shown in FIG. 7, a slight clearance is formed in a hub hole (center hole) in a wheel disc portion 3d of the tire-wheel assembly (not shown) with respect to a cylindrical protrusion 5a in a hub 5 of the axle side, so that the tire-wheel assembly is applied onto the hub 5 by passing plural hub bolts 6 (4–6 bolts in case of a passenger car) equally disposed on the hub 5 at a given pitch circle diameter (PCD) through respective bolt holes 9 formed in the disc portion 3d at the same PCD.

Then, a fastening nut 7 is screwed around each of the hub bolts 6 and is sufficiently clamped to fully contact the disc portion 3d to a contacting surface 5b of the hub 5 or fully contact a projecting portion formed around the bolt hole 9 to the contacting surface 5b in the illustrated embodiment. Thus whereby the mounting of the tire-wheel assembly onto the axle is completed.

As shown in FIG. 7, a tip portion of the fastening nut 7 mainly used in light vehicle, passenger car and small size truck has a taper seat 8, while the bolt hole 9 of the disc portion 3d has a taper seat having a shape corresponding to the shape of the taper seat 8. When clamping the nut 7, therefore, the taper seat of the tip portion of the nut 7 and the taper seat of the bolt hole 9 themselves act to exhibit a centering behavior with each other. Consequently, the tire-wheel assembly can adequately be mounted onto the axel of the vehicle without eccentricity from a center Cx of the axel.

Instead of the centering through the taper seat, a spherical seat (not shown) is formed in the tip portion of the nut 7 and also a seat having the same spherical shape as in the tip portion is formed in the bolt hole, whereby the adequate mounting of tire-wheel assembly onto the axel is practiced. Further, the mounting of the tire-wheel assembly through a so-called wheel bolt instead of the fastening nut 7 is widely carried out, in which a taper seat having the same shape as in the taper seat 8 of the nut 7 is formed on the head portion of the bolt for conducting the centering.

There are well-known the following three methods of clamping the fastening nut 7 or the wheel bolt in the mounting of the tire-wheel assembly onto the axel.

Firstly, there is a general method wherein the fastening nut 7 or the wheel bolt is usually screwed to a certain extent every one through a wrench and then clamped under a given uniform torque through a torque wrench.

Secondly, there is a method of simultaneously clamping plural fastening nuts 7 or the wheel bolts through a specific torque wrench, which is a special method adopted by automobile manufacturers aiming at the reduction of time required for the mounting of the tire-wheel assembly.

Thirdly, there is a method suitable for skilled workers wherein the fastening nut 7 or the wheel bolt is gradually clamped at positions corresponding to a diagonal line or opposite positions near thereto until the loosening of the nut 7 or the wheel bolt is removed while striking a tire of the tire-wheel assembly by hand or rotating the assembly and then the nuts 7 or the wheel bolts located at opposite positions are completely clamped through the torque wrench.

The tire-wheel assembly has a fairly heavy weight. For example, when the tire is a radial tire for passenger car having a tire size of 205/65R15 and the wheel is an aluminum wheel having a rim contour of 5 1/2J, the tire-wheel assembly has a weight of about 15 kg. Since a braking device for the vehicle should be arranged inside the tire-wheel assembly, the disc portion 3d of the wheel contacting with the hub 5 is offset toward the outside of the vehicle irrespectively of passenger car and truck and bus. As a result, it is obliged that the center of gravity in the tire-wheel assembly as a whole shifts at a position outward from an equatorial plane of the tire dividing the tire into two parts in the widthwise direction thereof.

Since the total weight of the tire-wheel assembly is heavy and the center of gravity of the assembly is offset outward from the mounting position, moment of shifting the center of gravity downward from the center of rotating axis in the axle of the vehicle always acts to the tire-wheel assembly at a state of contacting with the hub 5. When the fastening nut 7 or the wheel bolt is more clamped at such a state, the above moment overcomes the guiding action of the taper seat or spherical seat and hence both the centers of the rotating axis of the vehicle axle and the tire-wheel assembly become eccentric with each other without being arranged in the same straight line. That is, the tire-wheel assembly is mounted onto the vehicle axle at an eccentric state of the center of gravity of the assembly from the center of the rotating axis of the vehicle axle.

When the vehicle is run at such an eccentric state, exciting force is applied to the vehicle from unspringing position to create vibrations on the vehicle and also exciting force is applied to the tread rubber of the tire to create uneven wear. As a result, the effect of correcting static and dynamic unbalance quantities of the tire-wheel assembly to zero or near to zero before the mounting onto the vehicle for the control of vibrations during the running of the vehicle and the prevention of uneven wear of the tread rubber is largely damaged and also the vibration properties and the resistance to uneven wear in the vehicle provided with the tire-wheel assembly having insufficient corrected unbalance quantities are considerably degraded.

If the eccentric quantity is large, the exciting force creates a considerably large stress in the hub bolt 6 in addition to the simple degradation of the vibration properties in the high-speed running. In this case, the bolt 6 or the nut 7 is galled or occasionally creates fatigue breakage under the action of large repetitive stress and hence there is caused a fear of falling off the tire from the vehicle during the running. This tendency becomes remarkable when the weight of the tire-wheel assembly is heavy.

The relationship among the vibration of the vehicle, uneven wear of the tread rubber and the aforementioned mounting methods of the tire-wheel assembly onto the axle is investigated by comparison among the first to third methods, from which it is confirmed that the third method is superior to the first and second methods in accordance with the worker. However, the mounting work by the third method takes a long time and requires intuition based on the skilled worker's experience and also the scattering between the workers is large, so that it can not be said that the third method is general.

SUMMARY OF THE INVENTION

It is, therefore, an object of the invention to provide an apparatus and a process for assisting the mounting of a tire-wheel assembly onto an axle which can mount the tire-wheel assembly onto the vehicle axle with high precision without requiring a high level of skill and depending upon the weight of the assembly and rendering the assembly into an eccentric state while controlling the scattering between the workers to a minimum.

According to a first aspect of the invention, there is an apparatus for assisting the mounting of a tire-wheel assembly onto an axle comprising a pair of opposite clasping members sandwiching the tire-wheel assembly from its side surfaces therebetween and capable of adjusting a distance between the clasping members, a vibration applying machine fixed to one of the clasping members, and a fastening means for temporarily fastening the clasping members at a position of sandwiching the tire-wheel assembly.

In preferred embodiments of the invention, one of the clasping members is provided at its end side with a guide hole or a guide groove slidably guiding the other clasping member along the clasping direction of the tire-wheel assembly, and the fastening means is a slide-preventive member slidably engaging with an elongated hole formed in the clasping member to be guided so as to extend in the clasping direction thereof and preventing the sliding between mutual clasping members at the position of sandwiching the tire-wheel assembly. The slide-preventive member is comprised of a sleeve bearing provided with a flange contactly engaging with a peripheral portion of the elongated hole and slidably fitting to the elongated hole, a cam-shaped member provided with a shaft rotatably supported by the bearing, a handle rotating the cam-shaped member, a nut fastening the sleeve bearing to the clasping member and a nut fastening the shaft portion to the sleeve bearing. Alternatively, the slide-preventive member is comprised of a bolt slidably fitting to the elongated hole and a nut-shaped member contactly engaging with the peripheral portion of the elongated hole.

In the other preferred embodiments, the pair of the clasping members are a pair of arm members, and one of arm members is fixed to an end portion of a rod member and the other arm member is slidably attached to the rod member. The fastening means is comprised of male portion threaded on the rod member and a female member engaging with the male portion and capable of pushing one of the clasping members at the position of sandwiching the tire-wheel assembly.

According to a second aspect of the invention, there is the provision of a process for assisting the mounting of a tire-wheel assembly onto an axle of a vehicle, which comprises temporarily and loosely mounting the tire-wheel assembly onto the axle of the vehicle through fastening nuts or wheel bolts, applying a pair of opposite clasping members capable of adjusting a distance between the clasping members to both side surfaces of the tire-wheel assembly, temporarily fastening the clasping members through a fastening means so as to hold an applied state of the clasping member to the tire-wheel assembly, applying vibrations to the clasping members through a vibration applying machine fixed to one of the clasping members, and successively and completely clamping all of the fastening nuts or the wheel bolts while vibrating the tire-wheel assembly by the vibration applying machine to accurately arrange a center of rotating axis of the tire-wheel assembly and a center of rotating axis of the vehicle axle in a straight line.

DESCRIPTION OF THE PREFERRED EMBODIMENTS

Figure 1:
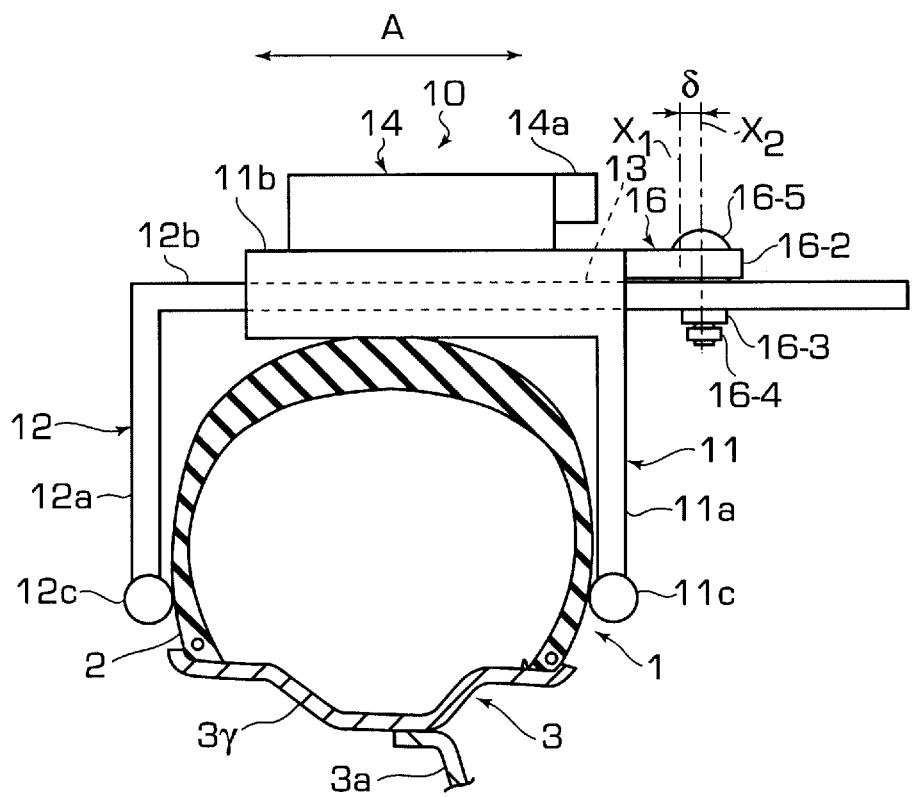
FIG. 1 is a side view partly shown in section of a first embodiment of the mounting assist apparatus according to the invention together with a tire-wheel assembly.

In the apparatus and process for assisting the tire-wheel assembly onto the vehicle axel according to the invention, the tire-wheel assembly inflated under a given internal pressure (higher or loser pressure in addition to standard internal pressure) (hereinafter abbreviated as an assembly) is temporarily and loosely mounted onto the axle of the vehicle (hub portion) through fastening nuts or wheel bolts, and sandwiched from its side surfaces between a pair of opposite clasping members capable of adjusting a distance between the clasping members. The clasping members are temporarily fastened at a position of sandwiching the assembly, and then a vibration applying machine fixed to one of the clasping members is actuated to vibrate the assembly at a given frequency as far as a clearance exists between a tip portion of the fastening nut and the bolt hole of the wheel or between a head portion of the wheel bolt and the bolt hole.

The continuation of vibration applied to the assembly to move the assembly by the above clearance acts to apparently overcome the eccentricity of the center of gravity of the assembly. As a result all of the fastening nuts or the wheel bolts are successively clamped little by little under the action of vibration, whereby the clamping force of the seat of each fastening nut or wheel bolt to the seat of each bolt hole in the disc portion can be rendered into an equal value and also the distribution of clamping pressure between the opposed seats over full surface can be made equal. As a result, the assembly can be mounted onto the axle while arranging the axial lines of the assembly and the axle in a straight line without causing the difference in the rotating axis between the assembly and the axle.

Thus, the vehicle provided with the assembly having at least a previously corrected unbalance quantity can develop good comfortability during the running without causing vibration phenomenon and completely eliminates a fear of causing an accident of the vehicle based on vibrations during running. Further, the occurrence of uneven wear in the tire based on eccentric vibration can be prevented during running of the vehicle.

In the pair of the clasping members, one of the clasping members is provided at its end portion with a guide hole or guide groove, e.g. a dovetail groove guiding the other clasping member along the clasping direction of the assembly. When both the clasping members are slidably engaged with each other through the guide hole or guide groove, the assembly can easily be sandwiched from both side surfaces across the tread between the clasping members.

Further, when the slide-preventive member is slidably engaged with the elongated hole formed in the clasping member to be guided to extend in the clasping direction, the mutual sliding between the clasping members can be prevented at the position of sandwiching the assembly to surely apply the exciting force to the assembly.

The shaft portion of the cam-shaped member is supported by the sleeve bearing slidably fitting to the elongated hole, while the bearing is fastened to the clasping member through a nut and separately fastened to the shaft portion through a nut. In this case, when the handle rotating the cam-shaped member is worked, even if the rigidity of the assembly in the widthwise direction of the tire is high, the assembly can strongly be sandwiched between the pair of the clasping members and hence the exciting force can surely be applied to the assembly. After completion of the mounting steps, the clamping of the nut is released, whereby the mounting assist apparatus can easily be taken off from the assembly.

Moreover, if the rigidity of the assembly in the widthwise direction of the tire is not so high, it is possible to sandwich the assembly between the clasping members by a more simple means until vibration can be applied to the assembly when using the slide-preventive member comprised of a bolt slidably fitting to the elongated hole and a nut-shaped member contactly engaging with the peripheral portion of the elongated hole.

When an arm member is flexed to an end portion of a rod member and another arm member is slidably attached to the rod member, the assembly can easily be sandwiched from both side surfaces between these arm members across the tread. Further, when a male portion is formed by threading the rod member and a female member is engaged with the male portion, the assembly can strongly be pushed from both side surfaces by the slidable arm members, whereby the same effect as attained in the use of the cam-shaped member can be obtained.

The following embodiments are given in illustration of the invention and are not intended as limitations thereof.

First Embodiment

This embodiment will be described with reference to FIGS. 1 to FIG. 4.

Figure 2:
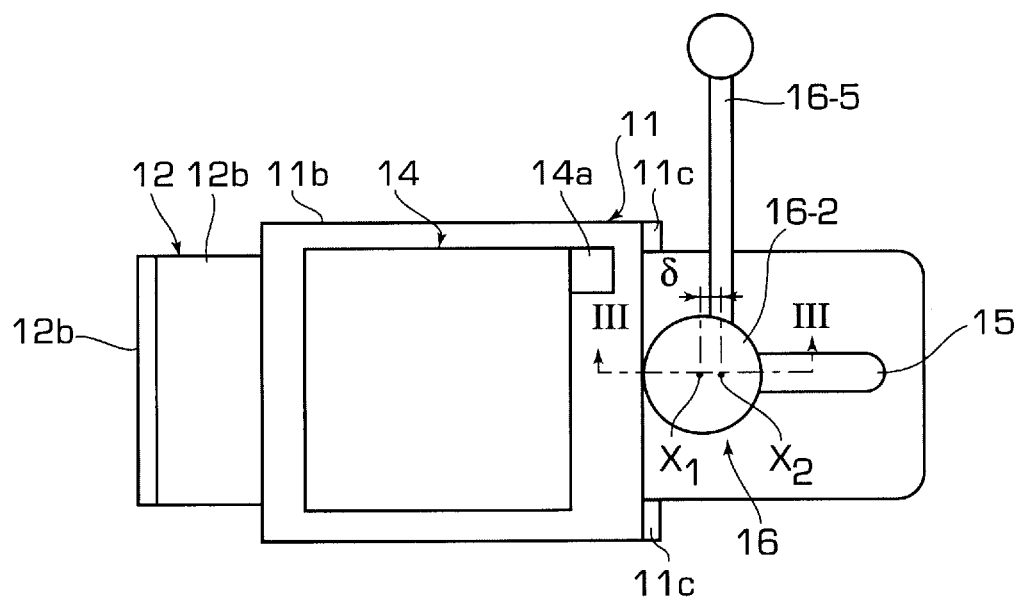
FIG. 2 is a plan view of the mounting assist apparatus shown in FIG. 1.
Figure 3:
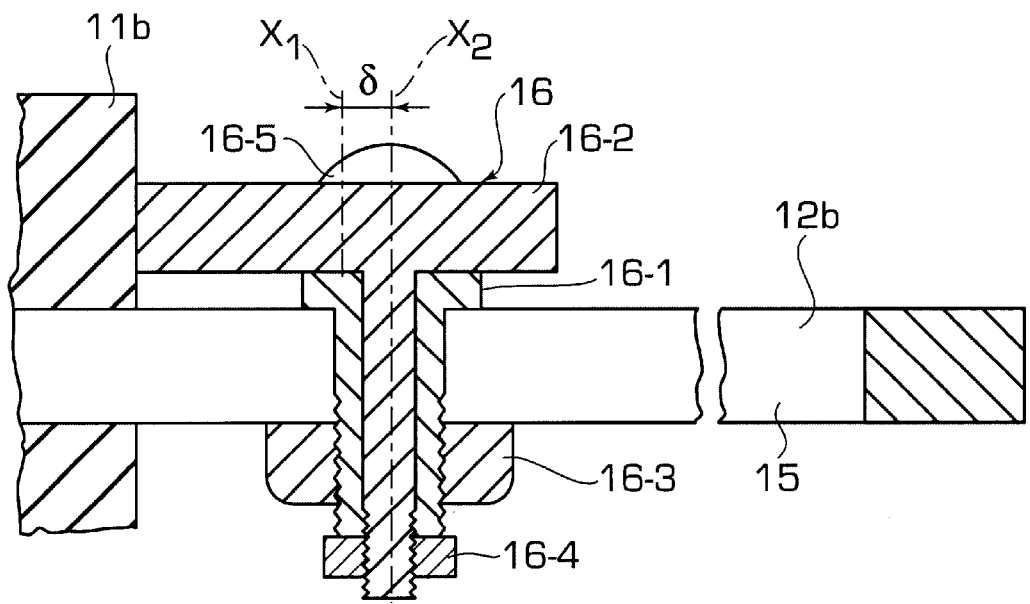
FIG. 3 is a sectional view of a main part of the mounting assist apparatus taken along a line III—III of FIG. 2.
Figure 4:
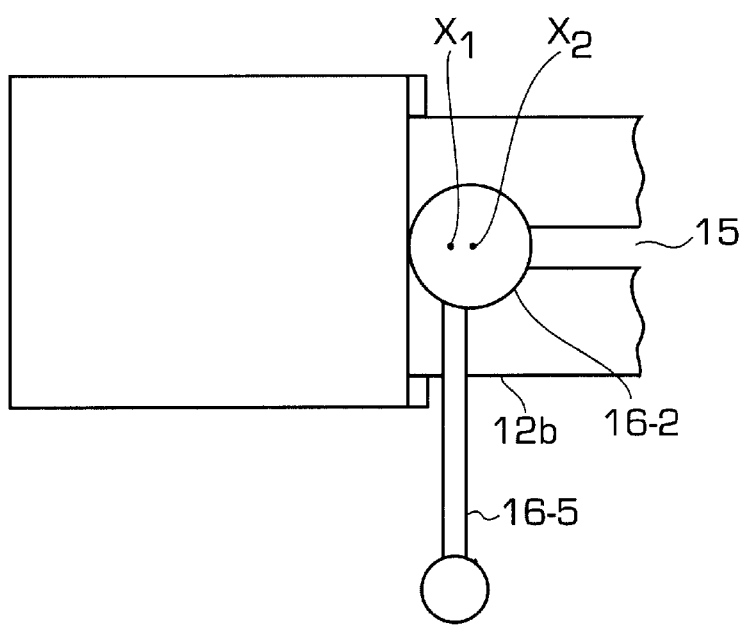
FIG. 4 is a schematically partial view illustrating another state of the mounting assist apparatus.

In FIG. 1 is simultaneously shown a section view of an assembly 1 including a center of rotating axis thereof and a side view of a mounting assist apparatus 10 according to the invention sandwiching the assembly 1, and FIG. 2 is a plan view of only the mounting assist apparatus 10, and FIG. 3 is a sectional view taken along a line III—III of FIG. 2, and FIG. 4 is a schematic view partially illustrating a worked state of the apparatus shown in FIG. 2. In FIGS. 1–4, an axle portion of a vehicle is omitted.

In FIG. 1, the assembly 1 is formed by mounting a tire (pneumatic radial tire) 2 onto a wheel 3 and preferably inflating it under a given internal pressure. The wheel 3 comprises a disc portion 3d and a rim portion 3r. Moreover, the right side of the assembly 1 is outside in the mounting onto the vehicle at the illustrated state.

In FIGS. 1 and 2, a pair of opposite clasping members 11, 12 comprise arm portions 11a, 12a and sliding portions 11b, 12b slidably engaging with each other. The arm portion 11a (12a) and the sliding portion 11b (12b) may be a one-piece body (illustrated embodiment) or integrally united with each other by a fixing member and has substantially an angular shape. Moreover, numerals 11c, 12c are protection bodies of rubbery elastomer, respectively, for preventing the damage of the tire when the arm portion 11a, 12a contact with the tire during the application of vibration.

The sliding portion 11b is provided with a guide hole 13 extending in the clasping direction of the assembly 1 or the widthwise direction of the tire 2. The guide hole 13 slidably houses the sliding portion 12b of the clasping member 12 so as to guide it in the widthwise direction of the tire 2 (within a distance shown by arrow A). That is, the distance between the arm portions 11a, 12a in the pair of the clasping members 11, 12 is freely adjusted. The sliding portions 11b, 12b have lengths corresponding to a range of tire size (tire width) in the assembly to be applied, provided that the length of the sliding portion 12b is sufficiently longer than the length of the sliding portion 11b.

Moreover, the guide groove (not shown) such as dovetail groove extending along the clasping direction may be used instead of the guide hole 13. In this case, the dovetail groove may be formed in the sliding portion 11b to guide the other sliding portion 12b in the same manner as described above.

In FIGS. 1 and 2, numeral 14 is a vibration applying machine, which is fixed to one of the clasping members. In the illustrated embodiment, the vibration applying machine 14 is merely arranged onto the sliding portion 11b, but may be arranged onto the arm portion 11a. Pressurized air is supplied into the inside of the vibration applying machine 14 from a pipe airtightly connected to a pressurized air source (not shown) through an inlet port 14a airtightly connected to the pipe, whereby a vibrator (not shown) included in the machine is actuated to generate vibrations acting to the whole of the clasping members 11, 12.

A frequency applied (vibration frequency) is variable in accordance with a pressure of the pressurized air supplied and is practically within a range of 30–100 Hz. When the vibration frequency is within the above range, equal clamping force and clamping pressure can be obtained without taking specific care on the clamping order of the nuts or bolts. The vibration applying machine used in this embodiment is a machine of CH 25 (trade name) made by Exxon Corp., in which the vibration frequency is about 60 Hz.

An elongated hole 15 extending along a distance shown by arrow A is formed in substantially a widthwise central part of the sliding portion 12b at a position opposite to the arm portion 12a. Numeral 16 is a slide-preventive member, a detail of which is shown in FIG. 3. The slide-preventive member 16 comprises a sleeve bearing 16-1 slidably fitting to the elongated hole 15 and provided at its end with a flange, a cam-shaped member 16-2 provided with a shaft rotatably supported by the bearing 16-4 or an eccentric disc in the illustrated embodiment, a nut 16-3 engaging with male portion formed on the end portion of the sleeve bearing 16-1 and a nut 16-4 engaging with a male portion formed on the shaft of the eccentric disc 16-2.

A center axial line $X_1$ of the eccentric disc 16-2 and a center of axis $X_2$ of the shaft are located to separate away from each other at a given distance δ, whereby the cam function of the eccentric disc 16-1 is developed with the rotating motion of the shaft. In this case, a handle 16-5 is preferably disposed on an outer periphery of can-shaped member or the eccentric disc 16-1 and it is desirable that the center of the attaching position of the handle passes through the axial center $X_2$ and is an intersect between straight line perpendicular to a plane including axial line $X_1$ and axial center $X_2$ and the above outer periphery as shown in FIG. 2.

The slide-preventive member is adaptable when it is required to strongly sandwich the assembly 1 between the clasping members 11, 12. If strong sandwiching is not required, the slide-preventive member may be comprised of a bolt loosely fitting to the elongated hole and a nut-shaped member engaging with the bolt to cause sufficient pushing force to the peripheral portion of the elongated hole, whereby the structure of the slide-preventive member can be more simplified.

Figure 7:
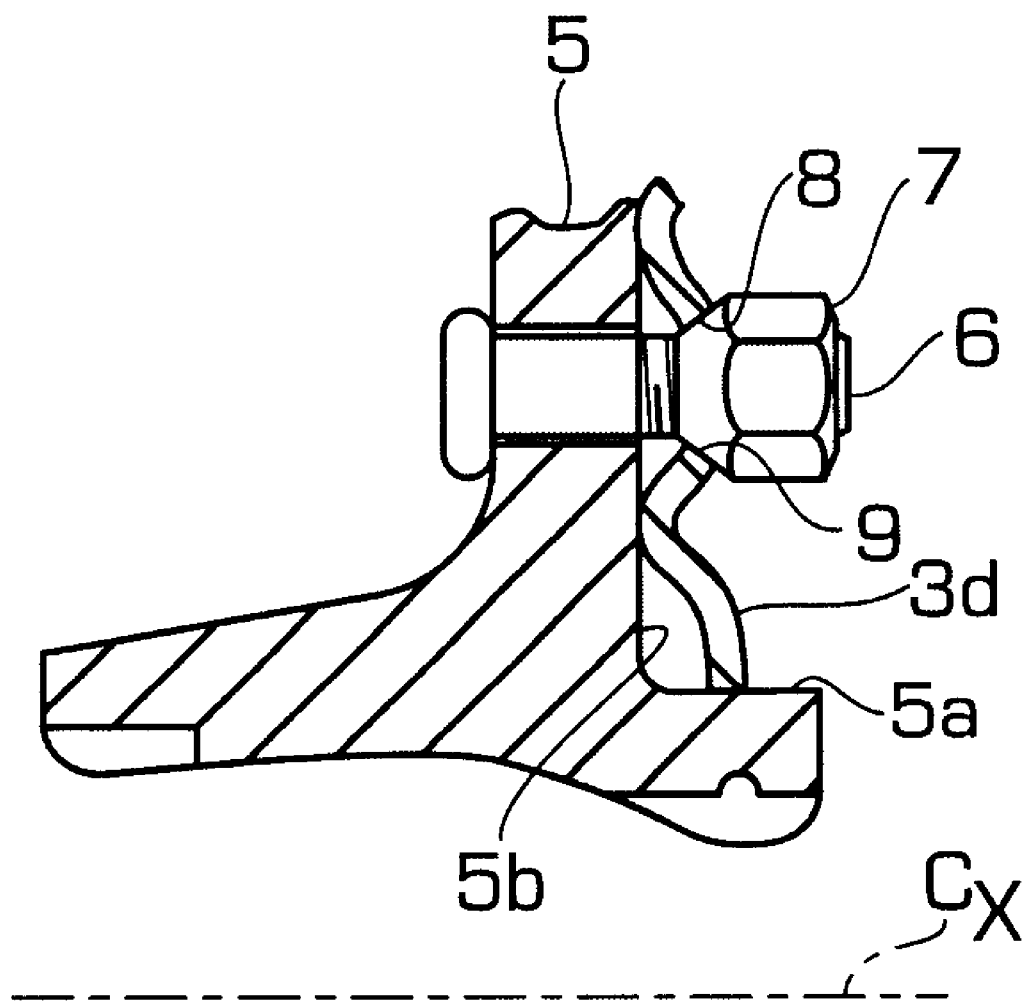
FIG. 7 is a sectional view of a main part of a disc portion of a tire-wheel assembly mounted onto a hub portion of an axel.

The mounting of the assembly 1 onto the axle of the vehicle will be described with respect to a case that the assembly 1 is mounted onto an axel of hub type 5 as shown in FIG. 7. Moreover, it is common sense that the detaching work of the assembly is facilitated by previously floating the vehicle through a jack or the like.

The assembly 1 provided with the tire 2 previously inflated under a given internal pressure and having unbalance quantity of zero or a value near thereto by desirably correcting static and dynamic unbalances by means of a proper balancer is temporarily mounted onto the hub 5 of the axle through the fastening nut 7 at a proper loosened state.

Thereafter, the mounting assist apparatus 10 is inset downward from an upper part of the assembly 1 as far as there is a sufficient clearance between the assembly 1 and the vehicle body, in which the clasping members 11, 12 are located to have a distance between mutual arm portions 11a, 12a exceeding a maximum width of the tire 2 and each of the arm portions 11a, 12a is directed to a direction of rotating axial center of the assembly 1. Then, either or both of the clasping members 11, 12 are slid to apply protective members 11c, 12c arranged on the arm portions 11a, 12a to both side surfaces of the tire 2. At the same time, the slide-preventive member 16 slide so as to apply to the slide portion 11b of the clasping member 11 at a loosened state of the nuts 16-3, 16-4 by the guiding action of the elongated hole 15.

When the slide-preventive member 16 is applied to the slide portion 11b, an outer peripheral surface of the eccentric disc 16-2 located nearest to the rotating axial center $X_2$ is applied to the sliding portion 11b (see FIG. 4). Then, the sleeve bearing 16-1 is strongly fixed to the sliding portion 12b of the clasping member 12 through the nut 16-3.

Next, the handle 16-5 is rotated in a counter-clockwise direction, whereby the slide portion 11b is forcedly moved inward (toward left side in FIGS. 1 and 2) by an eccentric quantity δ at maximum through the outer peripheral surface located faraway from the rotating axial center $X_2$. FIG. 2 shows a state of sliding the slide portion at the maximum eccentric quantity. If the rigidity of the sidewall portion in the assembly 1 is high, the rotation of the handle 16-5 may be stopped before the maximum eccentric quantity.

After rotation of the handle 16-5 is stopped, the shaft of the eccentric disc 16-2 is strongly fixed to the sleeve bearing 16-1 through the nut 16-4. Thus, the assembly 1 is first sandwiched between the clasping members 11, 12 while sufficiently pushing the arm portions 11a, 12a (protective members 11c, 12c) onto the sidewall portions of the tire 2.

The vibration applying machine 14 is actuated by supplying pressurized air while holding the above state to vibrate the assembly 1, during which plural fastening nuts 7, for example five fastening nuts 7 are successively clamped little by little. In this case, it is enough to take a care of causing no excessive clamping of the nut irrespective of the clamping order of the fastening nuts. After clamping of all fastening nuts is complete, the center of rotating axis of the assembly 1 is accurately arranged with the axial center of the axel in straight line.

Second Embodiment

This embodiment will be described with reference to FIGS. 5 and 6.

Figure 5:
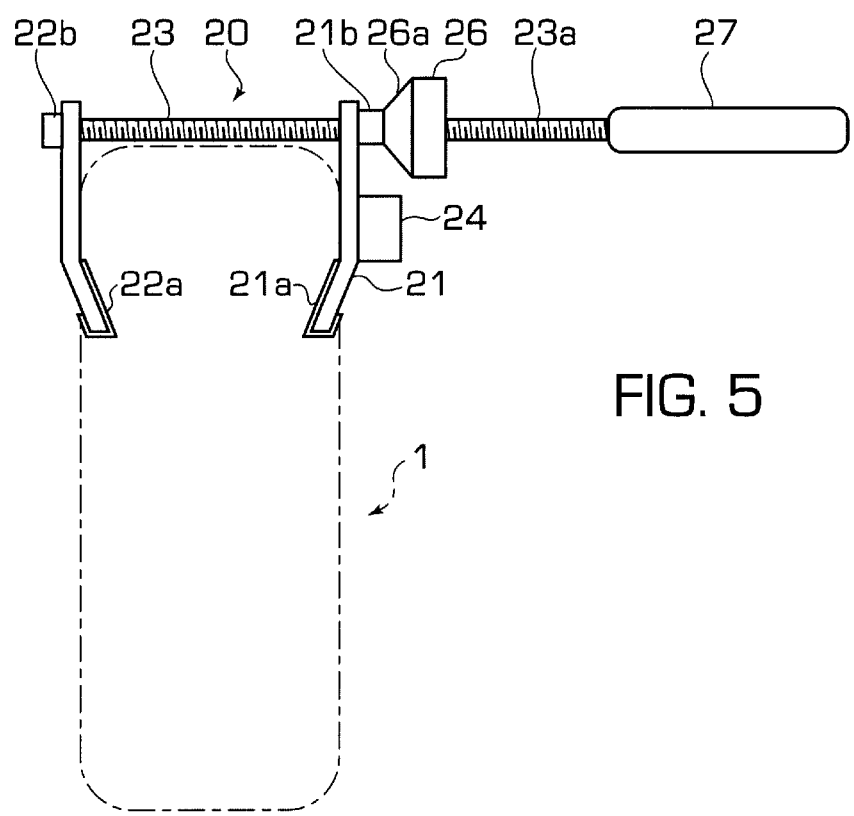
FIG. 5 is a side view partly shown in section of a second embodiment of the mounting assist apparatus according to the invention together with a tire-wheel assembly.
Figure 6:
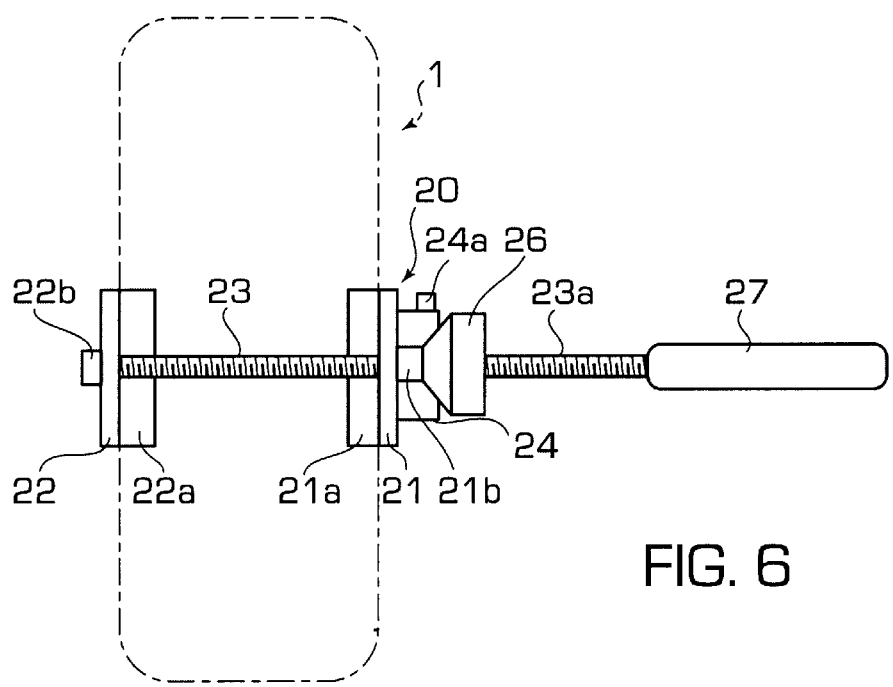
FIG. 6 is a plan view of the mounting assist apparatus shown in FIG. 5.

FIG. 5 shows a simplified schematic view of an outline of an assembly 1 including a rotating axial center thereof together with a side view of a mounting assist apparatus 20 illustrating a state of sandwiching the assembly 1 likewise FIG. 1, and FIG. 6 shows a perspectively plan view of the mounting assist apparatus 20 together with a schematic view of the outer contour of the assembly 1. In FIGS. 5 and 6, an axle portion of a vehicle is omitted.

A pair of clasping members are a pair of arm-shaped plate members somewhat bent at its top portion to increase a portion contacting with the assembly 1. One of these plate members 21, 22, particularly the plate member 22 in the illustrated embodiment is strongly attached and fixed to an end portion of a rod member 23, while the other plate member 21 is slidably attached to the rod member 23, whereby both the plate members 21, 22 are arranged to face each other and a distance therebetween is freely adjusted. Preferably, a slide assisting sleeve 21b is disposed on a slide portion of the plate member 21, and a fastening sleeve 22b is disposed onto a fastening portion of the plate member 22. Furthermore, thick solid portions 21a and 22a are rubbery elastomers developing the same function as the protective member in the first embodiment.

The rod member 23 is provided with a male portion 23a threaded from the right-hand end toward the left-hand side within a range adaptable to a tire size of the assembly 1 applied to the mounting assist apparatus 20. A female member 26 engaging with the male portion 23a is fitted onto the rod member 23 before the mounting of a grip 27 onto the rod member. Preferably, a taper portion 26a directing to the slide assisting sleeve 21b of the plate member 21 is formed on the female member 26 to provide a sufficient pushing contact with the slide assisting sleeve 21b and a base of the taper portion 26a is nut-shaped as shown in FIGS. 5 and 6. Although one female member 26 is used in the illustrated embodiment, double nuts may be used for the prevention of loosening by the application of vibration.

The same vibration applying machine 24 as in the first embodiment is fixed onto the surface of the plate member 21. In this case, vibrations having a frequency of about 60 Hz are generated by supplying the pressurized air through the inlet port 24a to the vibration applying machine 24 likewise the first embodiment.

The mounting of the assembly onto the axle of the vehicle in the second embodiment is fundamentally the same as in the first embodiment except for the following points. That is, only the arm-shaped plate member 21 as the clasping member is freely slided, and the plate member 21 is slided while applying to the plate member 22 to the assembly 1 during the inserting of the mounting assist apparatus 20 onto the assembly 1, and the strong sandwiching of the assembly 1 between the plate members 21, 22 is attained by the female member 26. The effects in the second embodiment are substantially the same as in the first embodiment.

In order to confirm the effects of the first and second embodiments as compared with the conventional method, an evaluation test is carried out as follows. The assembly 1 is comprised of a radial tire for passenger car having a tire size of 195/70R14 and a wheel having a rim contour of 14×6JJ and has a total weight of about 10 kg. After the assembly 1 is inflated under a given internal pressure, the unbalance quantity of the assembly 1 itself is rendered into approximately zero by using a balancer capable of precisely detecting the unbalance quantity and properly correcting static and dynamic unbalances.

The assembly 1 is mounted onto the vehicle and detached therefrom 10 times according to the mounting assist apparatuses of the first and second embodiments as well as the aforementioned conventional first method, during which the unbalance quantity (gr) of the assembly 1 mounted onto the vehicle is measured by means of on-the-car balancer every the mounting. The mounting work of the assembly 1 is carried out by a general skilled worker instead of an expert. The measured results every the mounting are shown in Table 1. Of course, the smaller the unbalance quantity, the better the property.

TABLE 1

| Measuring number | Dynamic unbalance quantity (gr) | | |
|---|---|---|---|
| | Conventional method | First embodiment | Second embodiment |
| 1 | 12 | 3 | 4 |
| 2 | 9 | 1 | 1 |
| 3 | 14 | 5 | 3 |
| 4 | 11 | 4 | 3 |
| 5 | 5 | 2 | 2 |
| 6 | 8 | 3 | 4 |
| 7 | 8 | 2 | 3 |
| 8 | 10 | 4 | 5 |
| 9 | 16 | 4 | 2 |
| 10 | 15 | 3 | 3 |
| average | 10.8 | 3.1 | 2.9 |

As seen from Table 1, the considerably improved balance property is obtained in the first and second embodiments as compared with the conventional method. It should be noticed that the unbalance quantity can be controlled to not more than ⅓ of the conventional method in all embodiments judging from the average value and is fairly smaller than the unbalance quantity of 10 gr or more in the conventional method causing a fear of creating violent vehicle vibrations during the high-speed running of the vehicle.

According to the invention, it is possible to mount the tire-wheel assembly onto the axel of the vehicle even by the generally skilled worker in a high precision without eccentrically arranging the assembly irrespective of the weight of the assembly while controlling the scattering between the workers at minimum. As a result, the good ride comfortability of the vehicle against vibrations is maintained and also there is caused no risk accompanied with vibrations during the running of the vehicle and there is no bad influence upon the resistance to uneven wear in the tire.

What is claimed is:

1. A process for assisting the mounting of a tire-wheel assembly onto a hub of an axle of a vehicle, which comprises the steps of; temporarily and loosely mounting the tire-wheel assembly onto the hub of the axle of the vehicle, applying a pair of opposite clasping members capable of adjusting a distance between the clasping members to both side surfaces of the tire-wheel assembly, temporarily fastening the clasping members through a fastening means to hold an applied state of the clasping member to the tire-wheel assembly, applying vibrations to the clasping members through a vibration applying machine fixed to one of the clasping members, and successively and completely clamping all of the fastening nuts or the wheel bolts while vibrating the tire-wheel assembly by the vibration applying machine to accurately arrange a center of rotating axis of the tire-wheel assembly and a center of rotating axis of the vehicle axle in a straight line.

2. A method according to claim 1, further comprising the step of providing one of clasping members at its end side with a guide for slidably guiding the other clasping member along the clasping direction of the tire-wheel assembly.

3. A method according to claim 1, further comprising the step of providing the fastening means as a slide-preventive member that slidably engaging with an elongated hole formed in the clasping member to be guided to extend in the clasping direction thereof and preventing the sliding between mutual clasping members at the position of sandwiching the tire-wheel assembly.

4. A method according to claim 3, wherein the slide-preventive member comprises a sleeve bearing provided with a flange said method comprising contactly engaging said flange with a peripheral portion of the elongated hole and slidably fitting to the elongated hole, a cam-shaped member provided with a shaft rotatably supported by the bearing, a handle rotating the cam-shaped member, a nut fastening the sleeve bearing to the clasping member and a nut fastening the shaft portion to the sleeve bearing.

5. A method according to claim 3, wherein the slide-preventive member comprises a bolt and said method comprises slidably fitting said bolt to the elongated hole and a nut-shaped member contactly engaging with the peripheral portion of the elongated hole.

6. A method according to claim 1, wherein the pair of the clasping members are a pair of arm members, and said method further comprises fixing one of arm members to an end portion of a rod member and the other arm member is slidably attached to the rod member.

7. A method according to claim 1, wherein the fastening means comprises a male portion threaded on the rod member and a female member engaging with the male portion and said method further comprises pushing one of the clasping members at the position of sandwiching the tire-wheel assembly.

* * * * *